United States Patent [19]
Verrier et al.

[11] Patent Number: 5,475,401
[45] Date of Patent: Dec. 12, 1995

[54] ARCHITECTURE AND METHOD FOR COMMUNICATION OF WRITING AND ERASING SIGNALS FROM A REMOTE STYLUS TO A DIGITIZING DISPLAY

[75] Inventors: Guy F. Verrier, Boca Raton, Fla.; John M. Zetts, Falls Church, Va.

[73] Assignee: International Business Machines, Inc., Armonk, N.Y.

[21] Appl. No.: 54,811

[22] Filed: Apr. 29, 1993

[51] Int. Cl.[6] ................................................. G08C 21/00
[52] U.S. Cl. ................................................ 345/179; 178/19
[58] Field of Search ..................... 178/18, 19; 345/173, 345/156, 178, 179, 180, 184

[56]  References Cited

U.S. PATENT DOCUMENTS

| | | | |
|---|---|---|---|
| 4,686,332 | 8/1987 | Greanias et al. | 178/19 |
| 4,697,050 | 9/1987 | Farel et al. | 178/18 |
| 4,786,764 | 11/1988 | Padula et al. | 178/18 |
| 5,007,085 | 4/1991 | Greanias et al. | 178/18 |
| 5,117,071 | 5/1992 | Greanias et al. | 178/19 |
| 5,149,919 | 9/1992 | Greanias et al. | 178/19 |
| 5,231,578 | 7/1993 | Levir et al. | 364/419 |
| 5,247,137 | 9/1993 | Epperson | 178/18 |

FOREIGN PATENT DOCUMENTS

| | | | |
|---|---|---|---|
| 3342522 | 6/1985 | Germany | 345/179 |
| 0099683 | 7/1980 | Japan | 178/18 |
| 60-218128 | 10/1985 | Japan | 345/179 |

*Primary Examiner*—Ulysses Weldon
*Assistant Examiner*—Lun-Yi Lao
*Attorney, Agent, or Firm*—Paul T. Kashimba; George E. Grosser

[57]  ABSTRACT

An architecture is disclosed for communication of remote devices to a digitizing display. The architecture includes a contact sensing erasure mechanism and a position sensing erasure mechanism whose outputs are multiplexed for transmission from the stylus to an antenna located proximate to the digitizing display. The digitizing display will erase text or graphics data in a pen-based computer system in response to the stylus. A calibration method provides improved accuracy for the erasure function.

6 Claims, 10 Drawing Sheets

FIG. 1A
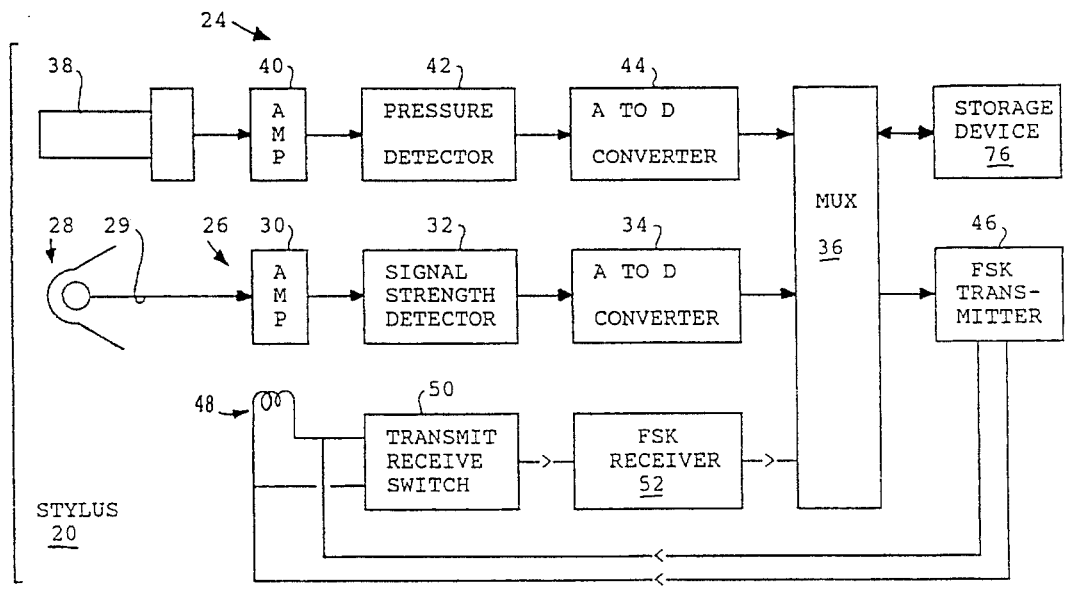
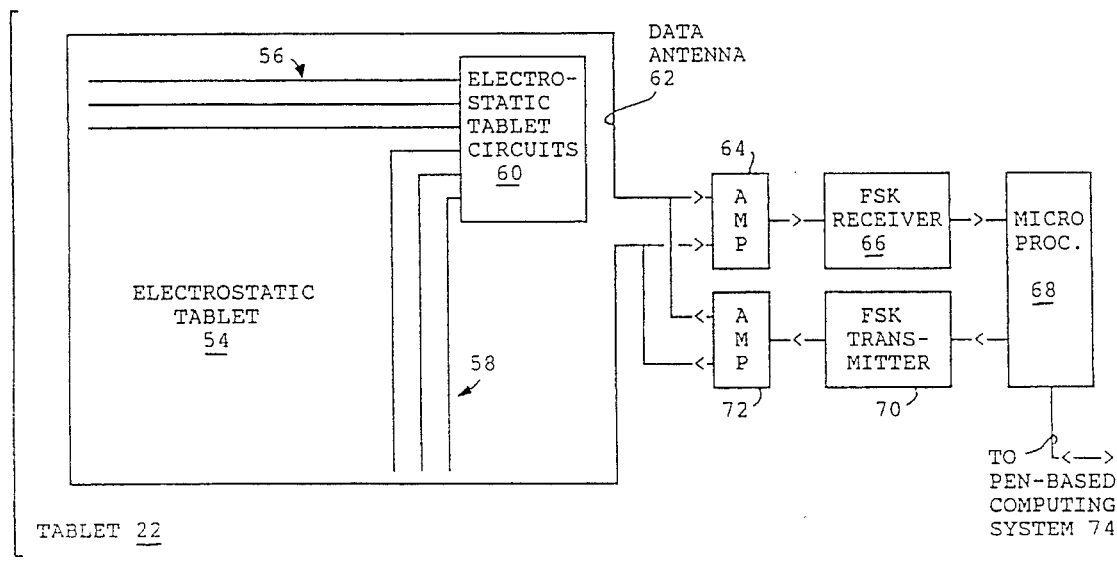

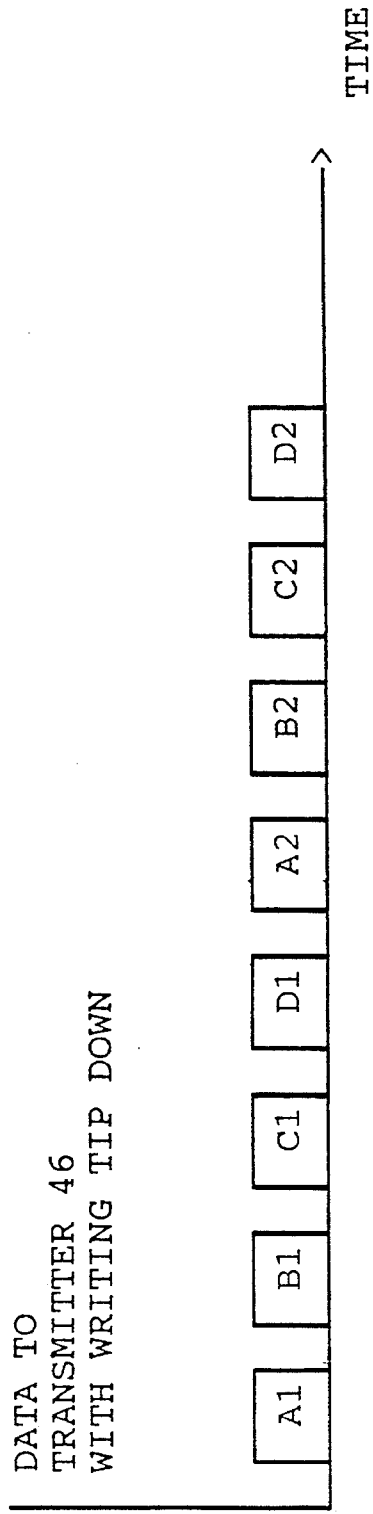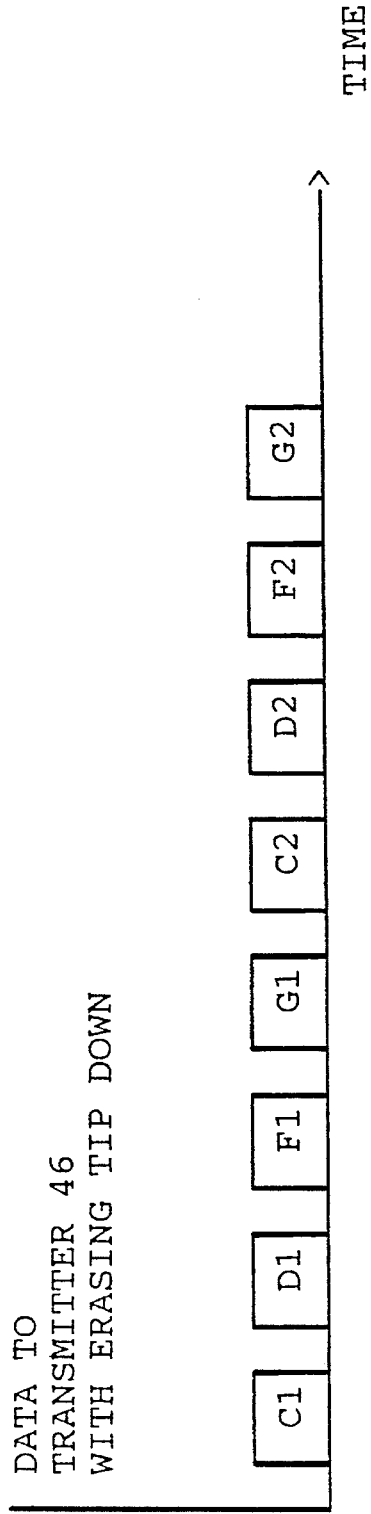

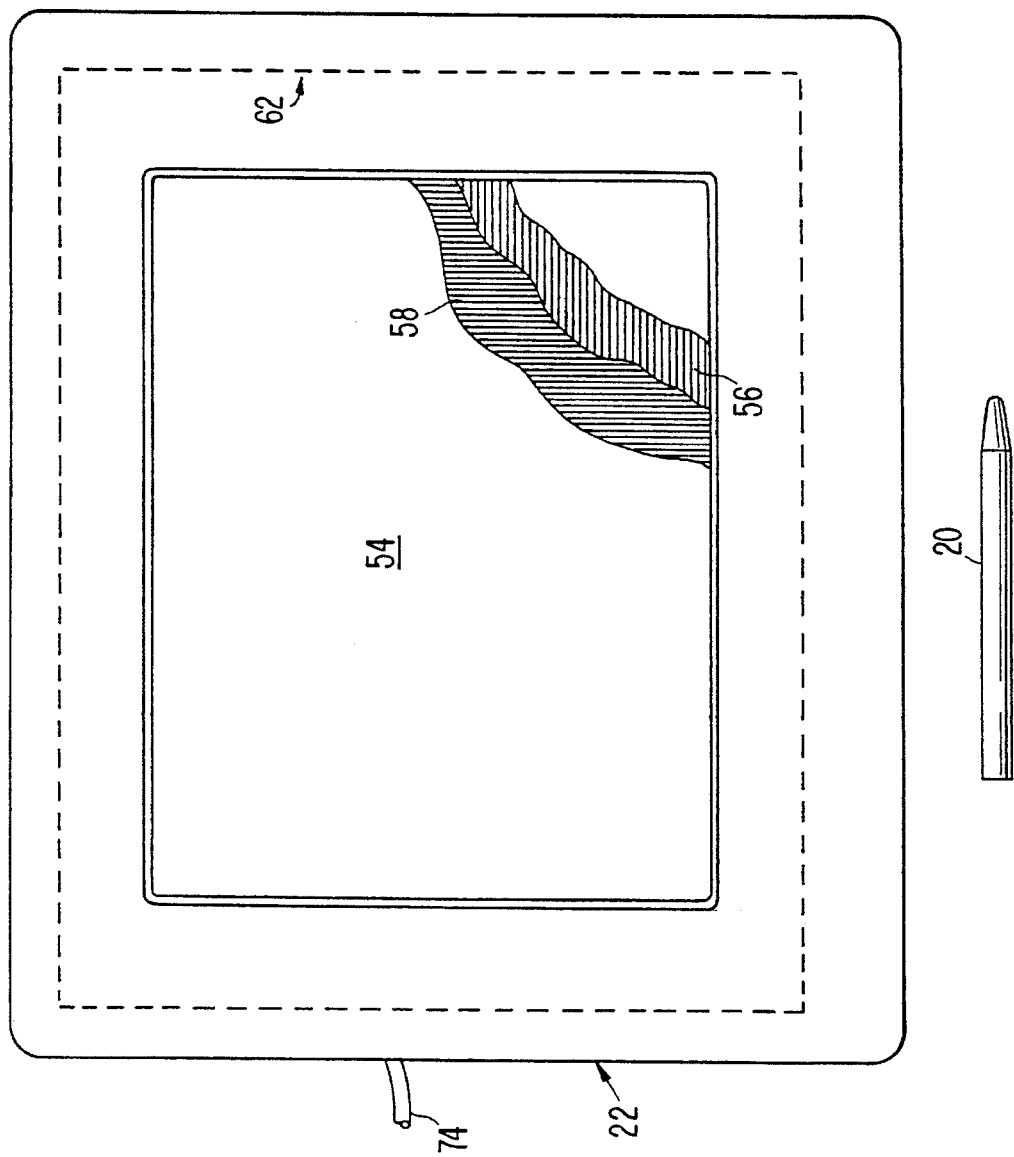

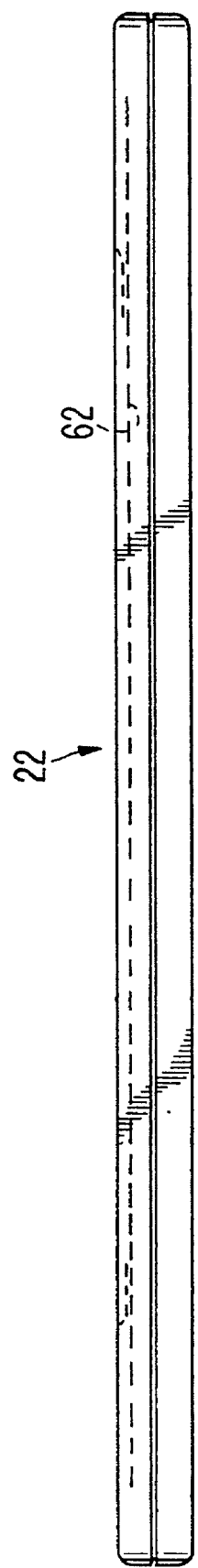

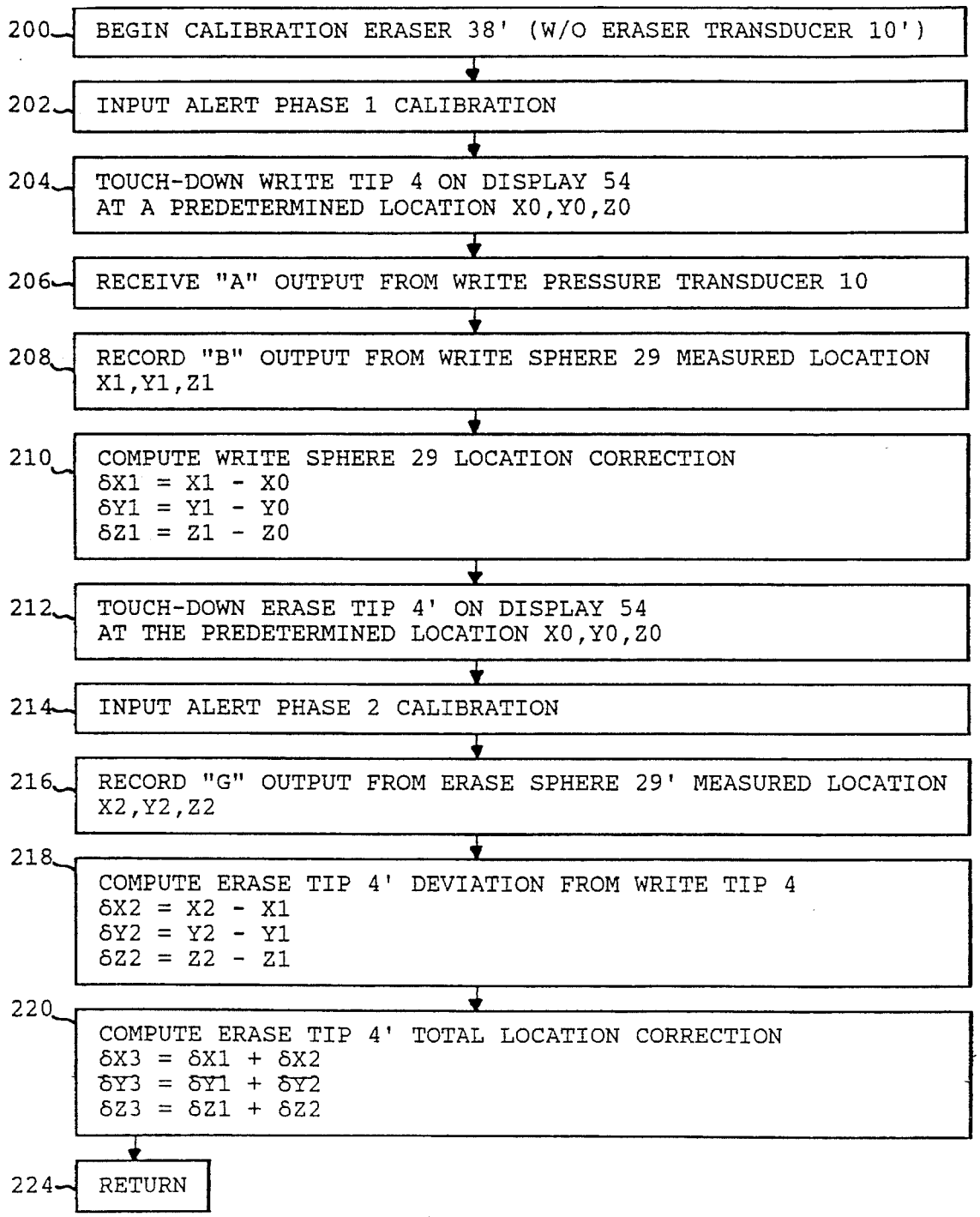

ARCHITECTURE AND METHOD FOR COMMUNICATION OF WRITING AND ERASING SIGNALS FROM A REMOTE STYLUS TO A DIGITIZING DISPLAY

BACKGROUND OF THE INVENTION

1. Technical Field

The invention disclosed broadly relates to data processing systems and more particularly relates to improvements in input/output devices for pen-based computer systems.

2. Related Patents and Patent Applications

The following patents and patent applications are assigned to the IBM Corporation and are incorporated herein by reference.

U.S. Pat. No. 4,686,332 entitled "Combined Finger Touch and Stylus Detection System for Use on the Viewing Surface on a Visual Display Device," by Evon C. Greanias, et al.

U.S. Pat. No. 5,007,085 entitled "Remotely Sensed Personal Stylus," by Evon C. Greanias, et al.

U.S. Pat. No. 5,117,071 entitled "Stylus Sensing System," by Evon C. Greanias, et al.

U.S. patent application Ser. No. 07/778,431, filed Oct. 16, 1991 entitled "Touch Overlay for Improved Touch Sensitivity," by Evon C. Greanias, et al.

U.S. patent application Ser. No. 07/351,227, filed May 15, 1989 entitled "Flat Touch Screen Workpad for a Data Processing System," by Gordon W. Arbeitman, et al.

U.S. patent application Ser. No. 07/969,864, filed Oct. 30, 1992 entitled "Architecture for Communication of Remote Devices to a Digitizing Display," by Guy F. Verrier, et al.

3. Background Art

Pen-based computer systems have been described in the prior art, for example in the above referenced U.S. Pat. No. 4,686,332 by Greanias, et al. In that system, a touch overlay membrane is positioned over the viewing surface of a display device such as a computer monitor, for interacting with a pickup stylus. The pickup stylus described in the '332 patent is connected by means of a wire to the pen-based computer system. The pen-based computer system generates a radiative signal in the touch overlay. The radiative signal is picked up by the stylus and sent back over the wire to the pen-based computer. The computer then calculates the relative X-Y position of the stylus with respect to the overlay. The relative proximity Z of the stylus to the overlay is determined by the signal amplitude picked up by the stylus from the electromagnetic energy radiated from the overlay. An improvement in the stylus pickup antenna is described in the above cited U.S. Pat. No. 5,117,071 by Greanias, et al. In the '071 patent, the antenna configuration in the tip of the stylus is a small sphere, whose shape enables a uniform signal strength to be picked up without regard for the relative orientation of the stylus with respect to the planar surface of the overlay. A further improvement has been made to the stylus by eliminating the cable connection between the stylus and the pen-based computer system, as is described in U.S. Pat. No. 5,007,085 by Greanias, et al. In the '085 patent, the signal detected by the stylus antenna which has been picked up from the electromagnetic radiation emitted by the overlay, is converted into a second signal which is transmitted either by infrared radiation, microwave radiation or radio frequency radiation at a different frequency, from the stylus back to an electromagnetic detector coupled to the pen-based computer system. Another improvement to pen-based computer systems is described in the above referenced U.S. patent application Ser. No. 07/351,227, filed May 15, 1989 by Arbeitman, et al. In the Arbeitman, et al. patent application, a flat touch screen workpad is substituted for the combination of the computer display monitor and touch overlay membrane. In the Arbeitman, et al. patent application, the radiative pickup stylus is connected by means of a wire to the flat touch screen workpad, for receiving the electromagnetic radiation emanated from the overlay membrane, the wire transferring the detected signal from the pickup stylus back to the electronics contained in the flat touch screen workpad.

In the description of the invention contained herein, the term "digitizing display" will be used to generally refer to either the combination of a computer display monitor and touch overlay membrane described in the '085 patent or alternately, the workpad display and overlay described in the Arbeitman, et al. patent application.

The above cited U.S. Pat. No. 5,007,085 entitled "Remotely Sensed Personal Stylus," by Evon C. Greanias, et al., describes a pen-based computer system which has a digitizing display which radiates electromagnetic signals which are picked up by a remotely sensing personal stylus. The antenna in the tip of the stylus picks up the electromagnetic signals radiated from the display overlay, and converts those signals into a suitable form for retransmission back to the pen-based computer system. The relative signal strength of the signals picked up by the stylus is used to infer the relative separation distance Z of the tip of the stylus with respect to the overlay. The converted signals are transmitted back to the pen-based computer system by means of a transmitting circuit and transmitting antenna within the stylus. The technique for determining contact between the stylus tip and the surface of the overlay, is by measuring the relative signal strength of the electromagnetic signal picked up by the tip of the stylus.

A problem with this prior art is that the detection of actual touchdown of the stylus onto the workpad surface is not very sensitive. Consider in normal handwriting how the writer's hand pressure varies during the course of writing a signature. The pressure applied by the pen to the paper varies over the course of inscribing the signature on the paper and sometimes includes a slight raising of the pen from the surface of the paper. The process of writing a signature on a digitizing display by means of a radiative pickup stylus, does not faithfully reproduce the intended shape on the display screen. When the stylus is raised slightly from the surface of the digitizing display, the separation of the stylus tip from the surface will not be detected in prior art systems. What results is spurious traces and artifacts which remain in the "inked" depiction of the user's signature because the system cannot detect the actual small separation of the stylus from the surface of the digitizing display. This problem has been solved by the above cited application Ser. No. 07/969,864 by Guy Verrier, et al.

A further problem with the prior art is its failure to provide a suitable means for erasing data already introduced to the workpad or digitizing display.

OBJECTS OF THE INVENTION

It is therefore an object of the invention to improve the accuracy of representing the erasure of handwritten characters and script in a pen-based computer system.

It is another object of the invention to more accurately detect the small but real separation of an electronic eraser from the surface of a workpad in a pen-based computer systems.

SUMMARY OF THE INVENTION

These and other objects, features and advantages are accomplished by the architecture for communication of writing and erasing signals from a remote stylus to a digitizing display. In accordance with the invention, a stylus in a pen-based computer system includes a contact detection mechanism and a radiative pickup position detector on both ends of the stylus. The first end of the stylus is used for the writing data into the pen-based system. The opposite end of the stylus is used for erasing data from the pen-based system. The invention includes an untethered stylus which has a first pressure sensing transducer and a first X-Y sensing transducer for writing data. The first pressure sensing transducer is coupled to a multiplexer and the first X-Y position sensing transducer is also connected to the multiplexer. The first pressure sensing transducer and the first X-Y sensing transducer are located on a first end of the stylus. Located on the opposite end of the stylus is a second pressure sensing transducer and a second X-Y sensing transducer for erasing data. The second pressure sensing transducer and the second X-Y position sensing transducer are also coupled to the multiplexer. Also included in the stylus is a transmitter having an input connected to the multiplexer for transmitting a multiplexed data stream of information representing contact pressure applied to a first pressure transducer, a first X-Y transducer, the second pressure transducer and the second X-Y position sensing transducer.

The system further includes a digitizing display which includes an electrostatic tablet which radiates electromagnetic radiation which is detected by the first X-Y position sensing transducer in the stylus when it is oriented proximate to the tablet. The electromagnetic radiation from the tablet is detected by the second X-Y position sensor in the stylus when it is oriented proximate to the tablet. A receiver is located proximate to the electrostatic tablet and is coupled to the pen-based computer system, for receiving the multiplexed data stream transmitted from the stylus. In this manner, an event of contacting the first pressure transducer on the surface of the electrostatic tablet in establishing an X-Y position of the first X-Y transducer with respect to the tablet, results in the writing of data into the system. Alternately, the event of contacting the second pressure transducer on the surface of the tablet and establishing an X-Y position of the second X-Y position transducer with respect to the tablet, results in erasing data in the system.

Additional features can be provided by the erasing end of the stylus. For example, any variation in the pressure applied to the second pressure transducer while the user is moving it over the surface of the tablet, will result in a corresponding variation in the width of the area erased. For example, in deleting lines of text, a light pressure on the second transducer would delete one line of text, whereas a medium pressure would delete two lines of text, and so forth. In graphics applications, a variation in the pressure applied to the second pressure transducer can be used for variations in shading by correspondingly increasing or decreasing the amount of graphical data erased from the tablet.

In an alternate embodiment of the invention, the eraser end of the stylus does not have a contact pressure sensor, but only an X-Y position sensing transducer. A coarse measurement of the distance of the eraser tip from the surface of the digitizing display is provided by the radiative pickup signal from the position sensing transducer. The distance above the surface and X-Y measurements of the eraser end are refined by a calibration method which makes use of the pressure sensing transducer and X-Y position sensing transducer on the opposite end of the stylus.

DESCRIPTION OF THE DRAWINGS

These and other objects, features and advantages will be more fully appreciated with reference to the accompanying figures.

FIG. 1A is an overall architectural diagram of the invention.

FIG. 4A is a waveform diagram of the output from multiplexer 36' to the transmitter 46 in FIG. 3, for the writing end 38 down.

FIG. 4B is a waveform diagram of the output from multiplexer 36' to the transmitter 46 in FIG. 3, for the erasing end 38' down.

FIG. 5 is a top view and FIG. 6 is a side view of the workpad 22.

FIG. 7A is a flow diagram of a sequence of operational steps for the calibration of the eraser 38' in an embodiment without the eraser transducer 10'.

DISCUSSION OF THE PREFERRED EMBODIMENT

FIG. 1 is an overall architectural diagram of the architecture for communications of remote devices to a digitizing display. The digitizing display which is described herein is described in greater detail in the commonly assigned U.S. Pat. No. 5,007,085 by Greanias entitled "Remotely Sensed Personal Stylus" and U.S. Pat. No. 4,764,885 by Greanias entitled "Proximity Sensing Blinking Cursor Feature and U.S. Pat. No. 4,686,332 by Greanias entitled "Thin Plastic Overlay for Finger and Stylus Display Input."

Figure 1B:
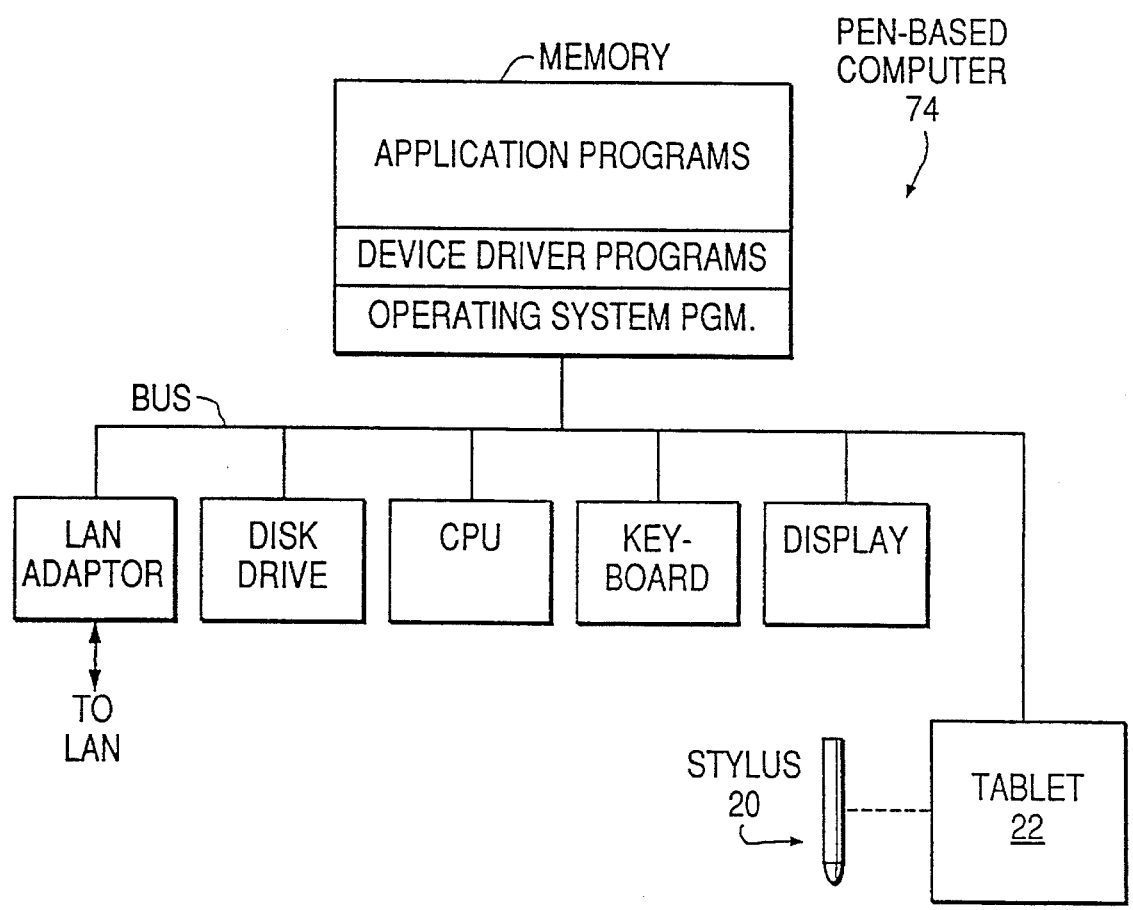
FIG. 1B shows the pen-based computer system.

FIG. 1B shows the pen-based computer system that includes the personal computer 74, the digitizing display or workpad tablet 22 and the stylus 20. The personal computer 74 includes a memory coupled by a system bus to a central processing unit (CPU), a keyboard, a display monitor, a disk drive bulk storage, a local area network (LAN) adapter and the tablet 22. The memory of the personal computer 74 stores an operating system program, device driven programs and application programs which are sequences of executable instructions that are executed in the CPU. The LAN adapter of the personal computer 74 connects to a local area network (LAN) that can connect the personal computer 74 to other computers and other networks. The stylus 20 communicates with the tablet 22 by means of an electromagnetic link that can be frequency modulated radio signals, amplitude modulated radio, or modulated optical or infrared radiation signals.

The architecture shown in FIG. 1 is divided in two principal parts. The first part is the stylus 20 and the second part is the digitizing display 22. The stylus 20 includes a first branch which can be for example branch 24 which is a mechanical contact detecting branch. The second branch can be for example branch 26 which is a position detecting branch.

Figure 2A:
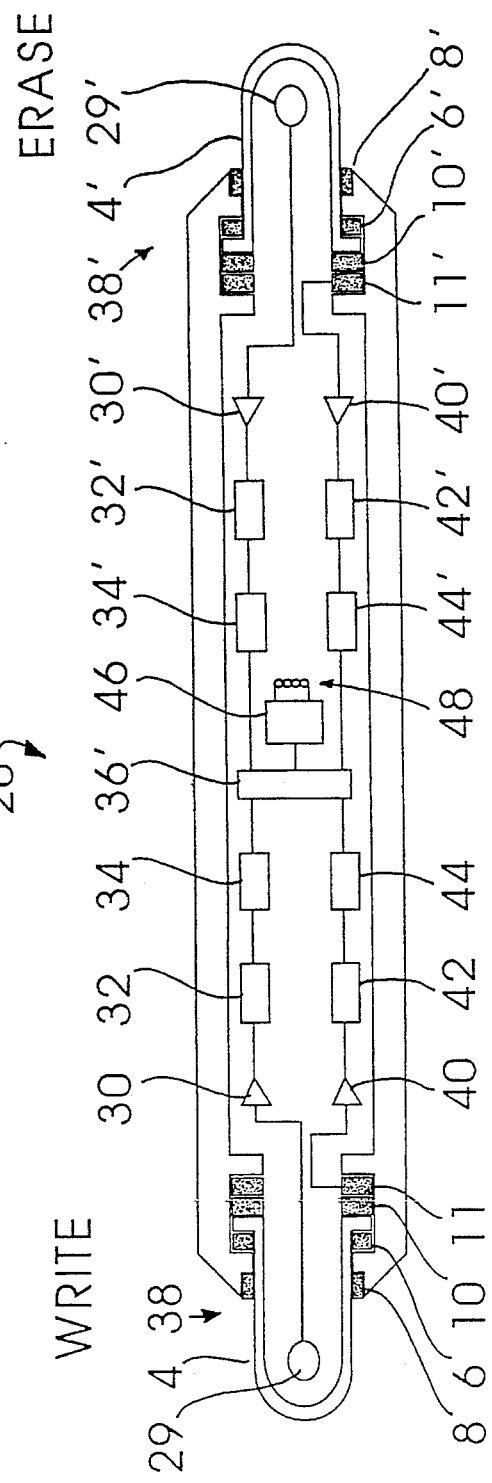
FIG. 2A is a mechanical side view of an example stylus 20 which includes a pressure-sensing mechanism in both ends thereof for picking up the pressure applied by the stylus to the surface of a digitizing display.

The contact detecting branch 24 can include a pressure detector 38, which is shown in greater detail in FIG. 2A. Connected to the pressure detector 38 is a signal amplifier 40 which has its output connected to the pressure detector circuitry 42. The output of pressure detector circuitry 42 goes to the analog-to-digital converter 44 which outputs a digital number representing the pressure applied by the pressure detecting mechanism 38 to the front surface of the electrostatic tablet 54 in FIG. 1. The output of the analog-to-digital converter 44 is then applied to a first input of the multiplexer 36.

FIG. 2A shows the stylus 20 and in particular, shows the details of the mechanical contacting mechanism 38. A pressure transducer 10 includes a layer formed of a force sensitive resistant (FSR) transducer material, for example, as manufactured by Interlink Electronics, Santa Barbara, Calif. Such material changes its resistance when compressed by the application of a force on its surface. Electrically conductive electrodes on the printed circuit board 11 contact separated portions of the surface of the FSR transducer layer 10 such that a complete circuit is formed between the conductors on the printed circuit board 11, by way of the FSR transducer layer 10. The electrodes on the printed circuit board 11 are pressed against the transducer 10 to complete the electrical circuit.

When the operational amplifier 440 shown in FIG. 1 is turned on but the stylus 20 is not yet in use, a voltage will be applied across the FSR transducer 10 by way of the stylus terminals and conductive electrodes 11. Then, when the tip 4 of the stylus 20 is pressed against the tablet surface 54, the FSR transducer layer 10 is compressed between the surfaces of two opposing parts. The first part is displaceable as the stylus tip 4, which is slightly displaced when pressure is exerted on the stylus tip 4. The other part of the compression mechanism is stationary and is the printed circuit board 11 which is held in place by the housing 2 shown in FIG. 2A. When the FSR transducer layer 10 is compressed, its electrical resistance changes such that a current and/or voltage change is produced at the output connected to the operational amplifier 40. This change is used to trigger the pressure detector 42, to acquire the pressure sensing data. Also included within the hollow tip 4 of the stylus 20 of FIG. 2, is the pickup antenna 29 shown in FIG. 1, which is radiatively coupled to the radiating electrodes 56 and 58 of the tablet 54.

In the position detecting branch 26 is the antenna device 29 described in U.S. Pat. No. 5,117,071 cited above, which picks up electromagnetic signals radiated from the conductors 56 and 58 in the electrostatic tablet 54. The output of the antenna 29 is coupled through the amplifier 30 to the signal strength detector 32. The output of the signal strength detector 32 is then applied to the analog-to-digital converter 34. The output to the analog-to-digital converter 34 is a digital representation of the signal strength detected by the antenna 29 for the signals radiated from the conductors 56 and 58 in the electrostatic tablet 54. The signals radiated from the electrostatic tablet 54 represent positional information when detected by the antenna 29, as described in U.S. Pat. No. 4,686,332, cited above.

The output of the signal strength detector 32 is applied to the analog-digital converter 34, which in turn outputs a digital representation of the relative position of the stylus 20 over the electrostatic tablet 54, as a number to a second input to the multiplexer 36.

Figure 3:
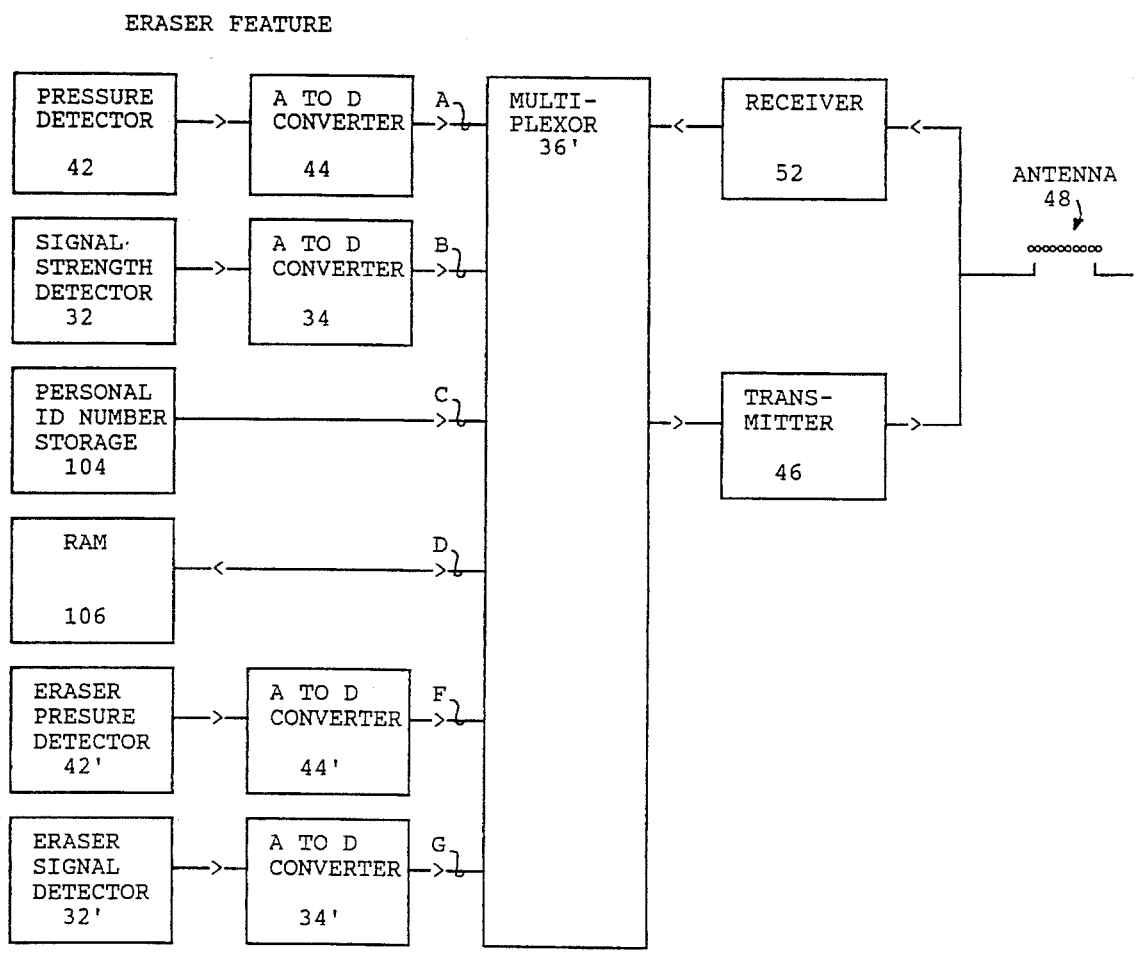
FIG. 3 is a schematic block diagram of an example plurality of sources of digital information which can be multiplexed and transmitted from the stylus to an antenna embedded in an associated digitizing display.

The multiplexer 36 is modified as multiplexer 36' in the schematic diagram in FIG. 3, to show additional inputs for the eraser end 38' of the stylus 20. There it is seen that the multiplexer 36 or 36' generates a time-divided sequence of numbers in data frames as shown in FIG. 4A, which are applied to the transmitter 46. The multiplexer can be controlled to change the order and content of the data stream. Returning back to FIG. 1, the multiplexed data stream of numbers alternately output from the pressure detector A-to-D converter 44 and the position detecting A-to-D converter 34 are applied to the frequency shift key (FSK) transmitter 46. The output of the transmitter 46 is then applied to the antenna 48 in the stylus 20. The stylus 20 then radiates the information which includes the applied pressure on the pressure detecting mechanism 38 and the X-Y position information from the antenna device 29. This data stream is radiated from the antenna 48 and is detected, in accordance with the invention, by the embedded antenna 62 in the digitizing display 22.

FIG. 2A shows a cross-sectional view of the stylus 20, and includes a schematic representation of the pressure sensing and position sensing electronics within the stylus. This includes the amplifiers 30 and 40, the detectors 32 and 42, the A-to-D converters 34 and 44, for the writing end 30, the amplifiers 30 and 40', the detectors 32' and 42', the A-to-D converters 34' and 44' for the eraser end 38', the multiplexer 36', the transmitter 46 and the antenna 48.

FIG. 3 shows the multiplexer now depicted as 36', which can replace the multiplexer 36 in FIG. 1. The multiplexer 36' in FIG. 3 has six input devices connected to it, the pressure detector 42, the signal strength detector 32, the personal identification number storage 104, the RAM 106, eraser pressure detector 42' and eraser signal detector 32'. The pressure detector 42 transfers the applied pressure signal input from the tip 4 of stylus 20 to the analog-to-digital converter 44, which outputs a digital representation of the applied pressure on input A to the multiplexer 36'. The signal strength detector 32 receives X-Y related position information and Z separation information from the antenna 29 and applies it to the analog-to-digital converter 34. The converter 34 outputs a digital representation of the X-Y position and Z separation over the input B to the multiplexer 36'. The personal identification number storage 104 can be a read-only storage or a writable EPROM which outputs an identifying digital number on the input C to the multiplexer 36'. The RAM 106 can store information which is output as digital information to the input D to the multiplexer 36'.

Also in FIG. 3, the pressure detector 42' transfers the applied signal input from the tip 4' of the stylus 20 for the eraser end 38'. The pressure detector 42' outputs its pressure signal to the analog-to-digital converter 44', which outputs a digital representation of the applied pressure on input F to the multiplexer 36'. The eraser signal strength detector 32' receives X-Y related position information and Z separation information from the antenna 29' located in the eraser end 38' of the stylus. The signal strength detector 32 outputs its signal to the analog-to-digital converter 34'. The converter 34' outputs a digital representation of the X-Y position and Z separation of the eraser tip 38' over the input G to the multiplexer 36'. These elements of the eraser feature are shown in greater detail in FIG. 2B.

FIG. 4A shows a waveform diagram of the multiplexed data stream output from the multiplexer 36' of FIG. 3 to the transmitter 46 for transmission over the antenna 48 in the stylus 20, when the writing end 38 is proximate to the tablet 54. The waveform diagram of FIG. 4A shows the multiplexed outputs A1, B1, C1 and D1 during a first time frame, which are respectively output over the lines A, B, C and D to the multiplexer 36' of FIG. 3. The waveform diagram of FIG. 4 also shows a second time frame during which a similar sequence of data words A2, B2, C2 and D2 are respectively output on the inputs A, B, C and D in FIG. 3.

FIG. 4B shows a waveform diagram of the multiplexed data stream output from the multiplexer 36' of FIG. 3 to the transmitter 46 for transmission over the antenna 48 in the stylus 20, when the erasing end 38' is proximate to the tablet 54. The waveform diagram of FIG. 4B shows the multiplexed outputs C1, D1, F1 and G1 during a first time frame, which are respectively output over the lines C, D, F and G to the multiplexer 36' of FIG. 3, when in the erasing mode when the end 38' is in operative contact with the tablet 54. The waveform diagram of FIG. 4B also shows a second time frame during which similar sequences of data words C2, D2, F2 and G2 are respectively output on the inputs C, D, F and G in FIG. 3. This mode of operation occurs when the erasure of data is desired by orienting the stylus 20 so that the erasing end 38' is proximate to the tablet 54.

The digitizing display 22 can be, for example, a transparent overlay superimposed on a conventional display monitor or a workpad coupled to a pen-based computer system. Included in the overlay, for example, can be the embedded antenna 62. Alternately, the antenna 62 can be proximate to the transparent overlay, but sufficiently close to enable detection of the multiplexed data stream transmitted from the antenna 48 of the stylus 20.

In accordance with the invention, the stylus 20 transmits by means of the antenna 48 information from the pressure detector 38 and the antenna 29 to the antenna 62 in the digitizing display 22. Antenna 62 in the digitizing display 22, is coupled through the amplifier 64 to the FSK receiver 66. The output of the receiver 66 is then applied to a microprocessor 68. The microprocessor 68 can, for example, strip out the respective numbers representing the contact pressure detected by the detector 38 in the stylus 20 and separately, the number representing the X-Y position location of the stylus with respect to the electrostatic tablet 54. The numerical values can then be forwarded by the microprocessor 68 to the pen-based computing system 74 for writing with the end 38.

Further in accordance with the invention, when used in the erasing mode, with the erasing end 38' proximate to the tablet 54, the stylus 20 transmits by means of the antenna 48 erasing signals from the pressure detector 38' and the antenna 29' to the antenna 62 in the digitizing display 22. Antenna 62 in the digitizing display 22 is coupled through the amplifier 64 of the FSK receiver 66. The output of the receiver 66 is then applied to the microprocessor 68, which can pass the erasing signals to the pen-based computer system 74 of FIG. 1B. The computer system 74 can perform the erasure of data already stored in the memory associated with the computer system 74. The computer system 74 can, for example, remove the F signals representing the contact pressure detected by the detector 42' in the stylus 20 and separately, the G signals representing the X-Y position location of the eraser tip 4' with respect to the electrostatic tablet 54 from the eraser signal detector 32'. These numerical values of the F and G signals can be used by the pen-based computing system 74 to perform the desired erasure of data already stored in the memory of the pen-based computing system 74.

Further in accordance with the invention, the stylus 20 can include a transmit/receive switch 50 which alternately connects the antenna 48 to either the FSK transmitter 46 or alternately to the FSK receiver 52 in the stylus 20. If the receiver 52 is connected to the antenna 48, the the stylus 20 can receive information in the form of electromagnetic signals radiated from the data antenna 62 in the digitizing display 22. In this mode of operation, the FSK transmitter 70 transfers digital information from the microprocessor 68 to the amplifier 72, which applies the digital information over the antenna 62 of the digitizing display 22. The radiated electromagnetic signals from the antenna 62 containing the digital information from the microprocessor 68, is radiated to the antenna 48 in the stylus 20. The antenna 48 is then connected through the transmit/receive switch 50 to the FSK receiver 52, which applies the received digital information from the digitizing display 22 to the multiplexer 36'. The multiplexer 36' will then apply the digital information to for example a storage device 76 in the stylus 20 or the RAM 106 in FIG. 3. In this manner, digital information can be transmitted from the digitizing display 22 and received and stored in the stylus 20.

The side cross-sectional view of the stylus 20 shown in FIG. 2A provides a detailed illustration of the mechanical parts of the pressure contacting portion of the writing end 38 and the erasing end 38'. The stylus 20 is designed to precisely determine when the tip 4 or 4' is in mechanical contact with the electrostatic tablet 54 and when it is not in mechanical contact. However, the tip contacting portion 38 or 38' can also output several intermediate states of pressure. For example, the contact portion 38 or 38' of the stylus 20 can output 16 levels represented by four binary bits of pressure. The 16 levels of pressure can be used for applications such as shading of drawings, moving a cursor fast or slow, drawing heavy or light lines, and other drawing applications. The construction of the stylus 20 shown in FIG. 2A enables very small longitudinal displacement of the probe tip 4 or 4' within the housing 2 to detect a range of force from 30 grams to 300 grams. The stylus 20 can use a transducing material such as the force sensing resistor made by Interlink, described above.

The design of the contact portion 38 or 38' shown in FIG. 2A eliminates friction which would prevent the detection of low pressure. It also allows the stylus to relax back to its non-contact state, to avoid confusing readings when detecting the tip 4 or 4' is just coming off the surface of the display 54. The design shown in FIG. 2A also provides a very low pre-load pressure on the force sensing resistor 10 so that the dynamic range of the force sensing resistor 10 is maximized. In addition, the design of the contact portion 38 or 38' in FIG. 2A minimizes the detection of lateral rather than axial or longitudinal forces.

The tip 4 or 4' of FIG. 2A floats freely between the cone and a brass shaft which holds the ball of the antenna 29, as described in the above referenced U.S. Pat. No. 5,117,071.

Bushing 8 and 8' are made of tetrafluoroethylene to minimize friction.

The gaskets 6 and 6' are made of very low durometer rubber to establish a minimum amount of pre-load pressure. Without some pre-load pressure, the tip 4 or 4' will move around inside the cone and create false readings as the stylus 20 is moved, rotated, shaken or tilted. However, if the gasket 6 or 6' is too stiff, this will reduce the sensitivity of the stylus to the detection of low forces and reduce the dynamic range of the stylus.

The tip 4 or 4' detects axial forces, along the line of the axis of the housing 20. The pen tip 4 and 4' contain the antenna 29 and 29' used for X-Y position determination, as is described in U.S. Pat. No. 5,117,071. The force sensing resistors 11 and 11' are the type used in membrane switch devices. The force sensing resistor 11 or 11' meets with a small circular printed circuit board 10 or 10' which is used to make appropriate contact with the force sensing resistor 11 or 11', respectively.

The force sensing resistor 11 or 11' generates a variable resistance which depends on the pressure applied to it by the tip. The force sensing resistor 11 or 11' can be biased by a reference voltage source for example 1.4 volts, so that a differential voltage across the device can be amplified by the operational amplifier 40 or 40', respectively. The output voltage can be adjusted to match the output voltage for the range of X-Y positioning of the amplifier 30 or 30' for the antenna 29 or 29', respectively. In this way, a common analog-to-digital conversion circuit could be used in an alternate embodiment to digitize both the pressure output by the pressure detector 42 or 42' and the signal strength output by the signal strength detector 32 or 32'. In such an alternate embodiment, appropriate switching between the pressure detector 42 and the signal detector 32 with the single analog-to-digital converter could be accomplished to perform an analog multiplexing of the analog signal input to the common analog-to-digital converter. Items 8 and 8' in FIG. 2A are bushings to maintain the tip 4 or 4' in concentric alignment with the cone of the housing of the stylus 20.

Figure 2B:
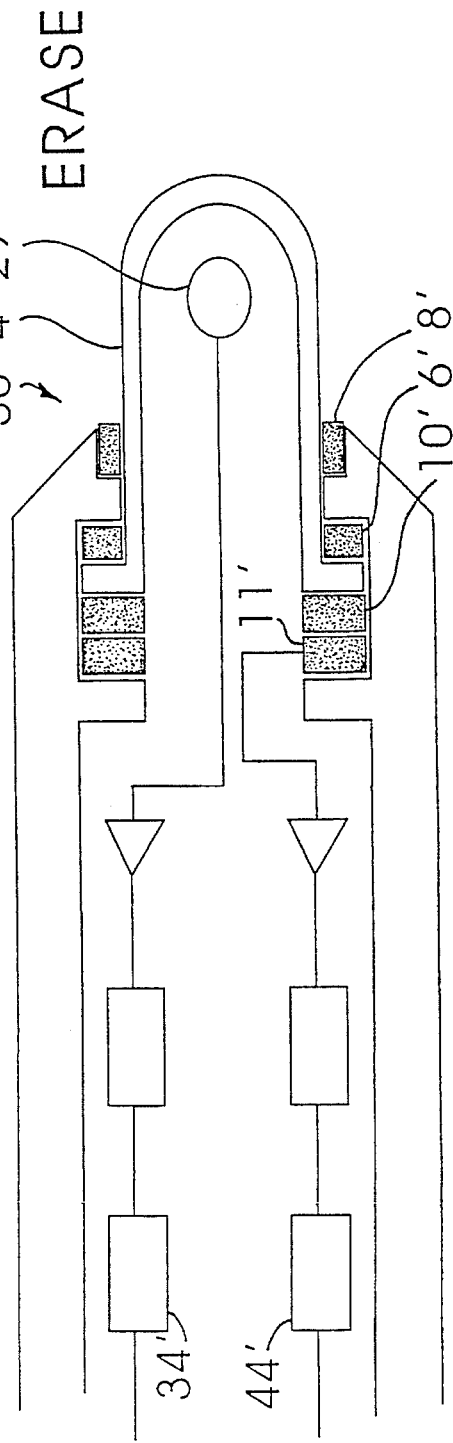
FIG. 2B is a more detailed view of the eraser end 38' of the stylus 20.

The side cross-sectional view of the stylus 20 shown in FIG. 2A and the more detailed view shown in FIG. 2B, provide a detailed illustration of the mechanical and electrical parts for the eraser in 38'. The stylus 20 is designed to precisely determine when the eraser tip 4' is in mechanical contact with electrostatic tablet 54 and when it is not in mechanical contact. However, the tip contacting portion 38' can also output several intermediate states of pressure. For example, the eraser contact portion 38' of the stylus 20 can output 16 levels represented by four binary bits of pressure, corresponding to 16 levels of erasure pressure applied to the tablet 54. The 16 levels of erasure pressure can be used for applications such as shading of drawings, erasing multiple lines of text, etc. The mechanical construction of the erasure portion 38' of the stylus 20 is the same as that previously described for the writing portion 38 of the stylus 20. The force sensing resistor 10' converts the pressure applied by the tip 4' into an electrical signal which is amplified by the amplifier 40' and applied to the erasure pressure detector 42'. The bushings 8' are made of the same material as the bushings 8. The gasket 6' is made from the same material as the gasket 6. The force sensing resistor 11' generates a variable resistance which depends on the pressure applied to it by the eraser tip 4'. The eraser tip 4' contains the antenna 29' used for the X-Y position determination of the eraser, as was described for the similar operation of the antenna 29 for the writing end of the stylus. The force sensing resistor 11' for the eraser end meets with the small circular printer circuit board 10' in the end 38', which is used to make appropriate contact with the force sensing resistor 11'. This operates in the same manner as was previously described for the elements in the writing end 38 of the stylus 20.

In accordance with the invention, the eraser end 38' of the stylus 20 enables the user to use the opposite end of the stylus from the writing end 38, as an eraser. It improves the functionality of the stylus 20. Further, by modifying the pressure which the user applies to the stylus against the tablet 54, the variation in pressure on the tip 4' is converted into variations in the width of the area erased in the pen-based system. For example, in deleting lines of text, a light pressure can delete a single line of text whereas a medium pressure can delete two lines of text and still higher pressures can delete still more lines of text. In graphics applications, variations in the pressure applied by the user to the erasing end 38', can be used for shading graphical data already stored in the pen-based system. For example, a dark image can be lightened according to the amount of pressure applied to the erasing end 38'.

As is described in the U.S. Pat. No. 5,117,071 to Greanias, et al. cited above, when the writing end of the stylus is initialized with the tablet 54, a series of compensation or calibration steps are taken to account for the nonlinear nature of the signal strengths and an offset compensation table is generated within the pen-based system, which is a function of the stylus geometry and the overlay geometry for the tablet 54. Since the X-Y location and the Z separation values for the stylus 4 for the writing end of the stylus 20 have their measured values depend on the particular stylus geometry and overlay geometry, real time measurements are corrected using a two-dimensional (X,Y) compensation table generated by the calibration steps. In accordance with the invention herein, that same compensation table can then be used to modify the measurements of the X and Y location and the Z separation distance of the tip 4' of the erasing end 38' for the stylus 20 herein. In this manner, the calibration steps performed with the writing end 38 to establish compensation tables for precise X-Y location and Z distance measurements, can also be applied to the erasing tip 4'.

In another embodiment of the invention, the storage device 76 can be a read-only storage such as 104 in FIG. 3, which stores a personal identification number or a password or other security information, which can be transmitted from the stylus 20 to the digitizing display 22, for processing in the pen-based computer 74, to validate the stylus or the user of the stylus.

FIG. 5 shows a more detailed view of the workpad embodiment of the digitizing display 22 and the associated pickup stylus 20. FIG. 6 is a side view of the workpad 22. FIG. 5 and FIG. 6 show the relative location of the embedded antenna 62 within the housing of the workpad 22. It can be seen how the electrostatic tablet 54 with its horizontal and vertical conductors 56 and 58 are positioned in relation to the antenna 62. The wire 74 connects the workpad 22 to the pen-based computing system.

Figure 2C:
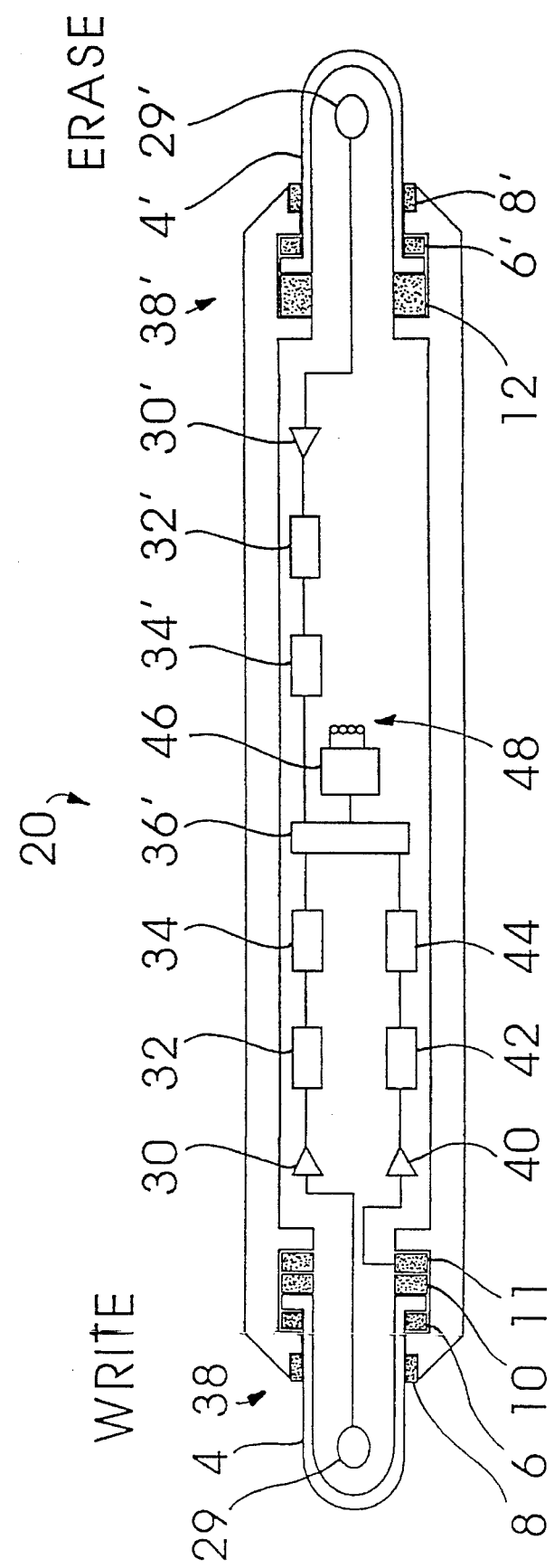
FIG. 2C is a mechanical side view of a second embodiment of the example stylus 20 which includes a pressure sensing mechanism on the write end but does not have a pressure sensing mechanism on the erase end of the stylus. A spacer 12 maintains a fixed position for the tip 4' within the erase housing 38'.

In an alternate embodiment of the invention, FIG. 2C shows the stylus 20 which has the erase end 38' which does not include a pressure sensing transducer 10'. A spacer 12 maintains a fixed position for the tip 4' within the housing of the stylus 20. In this alternate embodiment of FIG. 2C, the problem arises that the location calibration for the spherical antenna 29' for the eraser tip 38', is not readily available from a mechanical touch down sensor 10', as has been previously described. This problem is solved by the calibration process described in the flow diagram of FIG. 7A. The flow diagram of FIG. 7A depicts a sequence of operational steps which can be embodied in a program of executable instructions stored in the microprocessor 68 of FIG. 1 or in the pen-based computer system 74 of FIG. 1B.

In FIG. 7A, step 200 begins the process of calibration of the eraser 38' for the embodiment shown in FIG. 2C which does not have an eraser transducer 10'. Step 202 of FIG. 7A inputs an alert phase 1 calibration signal, such as from a keyboard coupled to a personal computer system 74.

Then step 204 has the user perform a touch down of the write tip 4 on the digitizing display 54 at a predetermined location X0,Y0,Z0. Then step 206 receives the A output from the write pressure transducer 10. Then step 208 records the B output from the sphere antenna 29 measured location X1,Y1,Z1 of the centroid. Then step 210 computes the write tip 4 location correction or measurement compensation table for the write function, which is delta X1, delta Y1 and delta Z1.

Delta X1=X1–X0
Delta Y1=Y1–Y0
Delta Z1=Z1–Z0

Step 212 has the user perform a touchdown of the erase tip 4' at the predetermined location X0,Y0,Z0 of the display 54. Then step 214 of FIG. 7A inputs the alert phase 2 calibration signal from the keyboard coupled to the computer system 74. Then step 216 records the G output from the sphere antenna 29' measured location X2,Y2,Z2 of its centroid. Then step 218 computes the deviation of the centroid of sphere antenna 29' from the centroid of the sphere antenna 29 which is delta X2, delta Y2 and delta Z2.

Delta X2=X2–X1
Delta Y2=Y2–Y1
Delta Z2=Z2–Z1

Then, step 220 computes the erase tip 4' total location correction or measurement compensation table for the erase function, which is delta X3, delta Y3 and delta Z3.

Delta X3=delta X1+delta X2
Delta Y3=delta Y1+delta Y2
Delta Z3=delta Z1+delta Z2

Then the program flows to step 224 which returns to the main program.

Figure 7B:
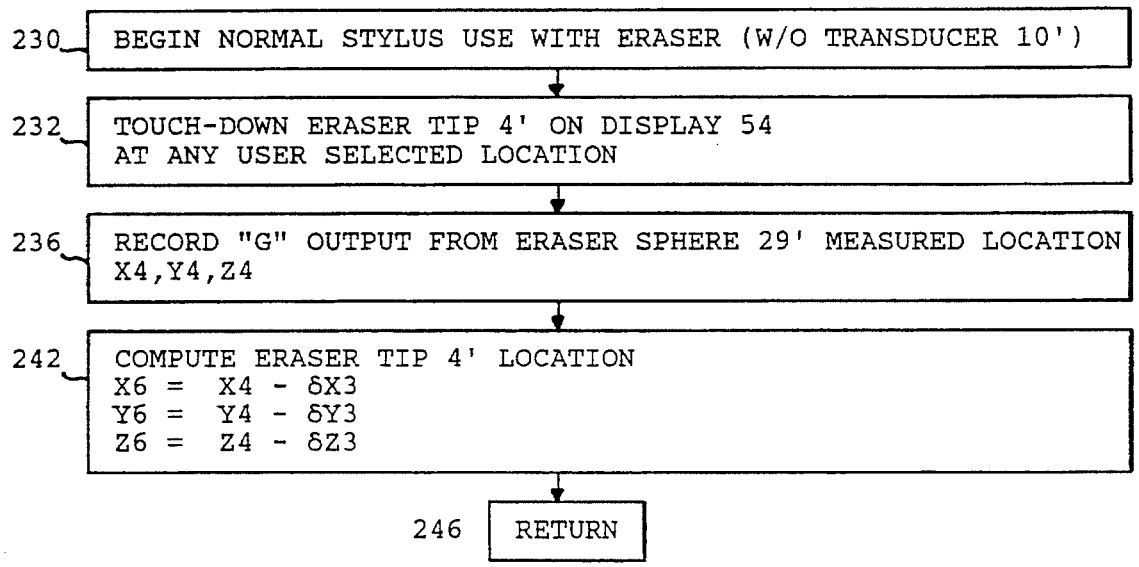
FIG. 7B is a flow diagram of the sequence of operational steps which begins the normal stylus use with the eraser 38', without the eraser transducer 10'.

FIG. 7B is a flow diagram of a sequence of operational steps which illustrates the normal use of the stylus in the second embodiment of FIG. 2C, where the eraser does not have the pressure transducer 10'. The flow diagram of FIG. 7B begins with step 230 which begins the normal stylus use. Step 232 has the user touch down the erase tip 4' on the digitizing display 54 at any user selected location. Then step 236 records the G output from the sphere antenna 29' measured location X4,Y4,Z4 of its centroid.

Then step 242 computes the eraser tip 4' location which is X6,Y6,Z6 using the measurement compensation table for the erase function.

X6=X4–delta X3
Y6=Y4–delta Y3
Z6=Z4–delta Z3

Then the program flows to step 246 which returns to the main program. The flow diagram of FIG. 7B can be embodied in a program of a sequence of executable instructions which run in the pen-based computer system 74.

In this manner, the pressure sensor in the write tip 38, in conjunction with the spherical antenna 29 in the write tip 38, can be used to calibrate the spherical antenna 29' in the erase tip, for the alternate embodiment of the stylus 20 shown in FIG. 2C.

Although specific embodiments of the invention have been disclosed, it will be understood by those having skill in the art that changes can be made to those specific embodiments without departing from the spirit and the scope of the invention.

What is claimed is:

1. In a data processing system, a radiative pickup stylus for a digitizing display, comprising:

a write tip on one end of the stylus and an erase tip on the opposite end;

said write tip including a mechanical touch down sensing mechanism and a first radiative antenna mechanism which receives radiative signals from said digitizing display and providing a first set of input signal to a multiplexer;

said erase tip including a second radiative antenna mechanism and providing a second set of input signal to the multiplexer;

a transmitter in said stylus having an input connected to said multiplexer for transmitting a multiplexed data stream of information representing the position of the stylus for writing data;

said transmitter further transmitting a multiplexed data stream of information representing the position of said stylus for erasing data; and means for calibrating said erase tip, coupled to said write tip and said erase tip, by measuring a first radiative pickup signal strength in said first set of input signals from said first antenna in said write end while mechanically contacting said digitizing display, measuring a second radiative pickup signal strength in said second set of input signals from said second antenna in said erase end, and adjusting a radiative detection means coupled to said second antenna in said erase end, in response to said first and said second radiative pickup signal strengths.

2. A data processing architecture for a pen-based computing system, having a real time erase feature, comprising:

a stylus device which includes a first end having a first pressure sensing transducer and a first X-Y position sensing transducer for writing data and having a second end which includes a second X-Y position sensing transducer for erasing data;

said first pressure sensing transducer coupled to a multiplexer, said first X-Y position sensing transducer connected to said multiplexer and said second X-Y position sensing transducer connected to said multiplexer;

a transmitter in said stylus for transmitting a multiplexed data stream of information coming from said first pressure transducer and said first X-Y position transducer and representing the position of the stylus for writing data;

said transmitter further transmitting a multiplexed data stream of information coming from said second pressure transducer and said second X-Y position transducer and representing the position of said stylus for erasing data;

said system further comprising a digitizing display which includes an electrostatic tablet which radiates electromagnetic radiation which is detected by said first X-Y position sensor in said stylus when said stylus is oriented with its writing end proximate to said tablet;

said electromagnetic radiation radiating from said electrostatic tablet being detected by said second X-Y position sensor in said stylus when said stylus is oriented with its erasing end proximate to said tablet;

a receiver coupled to said electrostatic tablet and coupled to said pen-based computer system, for receiving said multiplexed data stream transmitted from said stylus; and calibration means in said pen-based system, for using first end calibration data derived from an event of contacting said first pressure transducer on the surface of said electrostatic tablet and establishing an X-Y sensing position of said first X-Y transducer with respect to said tablet, to calibrate said second end for erasing data, by combining said first end calibration data with an X-Y sensing position of said second X-Y transducer with respect to said tablet.

3. The system of claim 2 where said first X-Y position sensing transducer is used to generate a measurement compensation table which is used by said second X-Y position sensing transducer to correct measurements generated therefrom.

4. A data processing architecture for a pen-based computing system, having a real time erase feature, comprising:

a stylus device which includes a first end having a first pressure sensing transducer and a first X-Y position sensing transducer for writing data and having a second end which includes a second pressure sensing transducer and a second X-Y position sensing transducer for erasing data;

said first pressure sensing transducer coupled to a multiplexer and said first X-Y position sensing transducer also connected to said multiplexer;

said second pressure sensing transducer coupled to said multiplexer and said second X-Y position sensing transducer also connected to said multiplexer;

a transmitter in said stylus for transmitting a multiplexed data stream of information coming from said first pressure transducer and said first X-Y position transducer and representing the position of the stylus for writing data;

said transmitter further transmitting a multiplexed data stream of information coming from said second pressure transducer and said second X-Y position transducer and representing the position of said stylus for erasing data;

said system further comprising a digitizing display which includes an electrostatic tablet which radiates electromagnetic radiation which is detected by said first X-Y position sensor in said stylus when said stylus is oriented with its writing end proximate to said tablet;

said electromagnetic radiation radiating from said electrostatic tablet being detected by said second X-Y position sensor in said stylus when said stylus is oriented with its erasing end proximate to said tablet;

a receiver coupled to said electrostatic tablet and coupled to said pen-based computer system, for receiving said multiplexed data stream transmitted from said stylus;

whereby an event of contacting said first pressure transducer on the surface of said electrostatic tablet and establishing an X-Y position of said first X-Y transducer with respect to said tablet, are transmitted from said stylus, through said receiver, to said pen-based computer system for writing data thereto and an event of contacting said second pressure transducer on the surface of said electrostatic tablet and establishing an X-Y position of said second X-Y transducer with respect to said tablet are transmitted from said stylus, through said receiver to said pen-based computer system for erasing data in said pen-based computer system.

5. The system of claim 4 where said first X-Y position sensing transducer is used to generate a measurement compensation table which is used by said second X-Y position sensing transducer to correct measurements generated therefrom.

6. The system of claim 4 which further comprises said second pressure sensing transducer providing variable pressure sensing signals in response to varying detected pressures, for producing variable quantities of erasure of data in said pen-based computer system.

* * * * *